(12) United States Patent
Kayastha

(10) Patent No.: US 12,374,029 B2
(45) Date of Patent: Jul. 29, 2025

(54) TECHNOLOGIES FOR RENDERING ITEMS AND ELEMENTS THEREOF WITHIN A DESIGN STUDIO

(71) Applicant: CIMPRESS SCHWEIZ GMBH, Winterthur (CH)

(72) Inventor: Christina Kayastha, Somerville, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 89 days.

(21) Appl. No.: 17/853,392

(22) Filed: Jun. 29, 2022

(65) Prior Publication Data

US 2022/0414976 A1    Dec. 29, 2022

Related U.S. Application Data

(60) Provisional application No. 63/216,057, filed on Jun. 29, 2021.

(51) Int. Cl.
*G06T 15/50* (2011.01)
*G06Q 30/0601* (2023.01)

(52) U.S. Cl.
CPC ......... *G06T 15/50* (2013.01); *G06Q 30/0643* (2013.01)

(58) Field of Classification Search
CPC ... G06T 15/50; G06T 15/506; G06Q 30/0643; G06F 3/1208; G06F 3/1256; G06F 3/04845
See application file for complete search history.

(56) References Cited

U.S. PATENT DOCUMENTS

| | | | |
|---|---|---|---|
| 10,217,286 B1 * | 2/2019 | Angel | G06F 3/013 |
| 10,467,802 B2 | 11/2019 | Harrington et al. | |
| 10,467,803 B1 * | 11/2019 | Degtyarev | G06T 5/70 |
| 11,423,606 B2 | 8/2022 | Harrington et al. | |

(Continued)

FOREIGN PATENT DOCUMENTS

EP    2828842 B1    9/2019

OTHER PUBLICATIONS

Color photograph of standard business cards, image downloaded from the Internet at: <https://www.vistaprint.com/business-cards/standard?GP=07%2f23%2f2018+13%3a18%3a21&GPS=5120582000&GNF=0.

(Continued)

*Primary Examiner* — Sarah Lhymn
(74) *Attorney, Agent, or Firm* — MARSHALL, GERSTEIN & BORUN LLP

(57) ABSTRACT

Systems and methods for rendering items in a user interface are described. According to certain aspects, an electronic device may initiate, on a display of the electronic device, a user interface for displaying a rendering of an item. In embodiments, the user interface may include selectable options for editing design elements of the item. As a user of the electronic device moves a pointer on the user interface, the electronic device may automatically and dynamically configure a lighting effect simulating a virtual light source by setting a position of the virtual light source to the location of the pointer. A rendering of the item can then be generated by applying the lighting effect to a digital image of the item, where the lighting effect can be updated responsive to movement of the pointer.

13 Claims, 8 Drawing Sheets

(56) References Cited

U.S. PATENT DOCUMENTS

| | | | |
|---|---|---|---|
| 2007/0150163 A1* | 6/2007 | Austin | G06F 16/313 |
| | | | 707/E17.084 |
| 2008/0031499 A1 | 2/2008 | Mills et al. | |
| 2008/0301546 A1* | 12/2008 | Moore | G06T 11/60 |
| | | | 715/243 |
| 2010/0103303 A1 | 4/2010 | Lim et al. | |
| 2011/0205238 A1* | 8/2011 | Wallace | G06F 9/451 |
| | | | 345/589 |
| 2012/0256948 A1 | 10/2012 | Fermin et al. | |
| 2012/0259727 A1 | 10/2012 | Fermin et al. | |
| 2013/0335437 A1* | 12/2013 | Lynn | G06T 13/80 |
| | | | 345/589 |
| 2014/0047413 A1* | 2/2014 | Sheive | G06F 8/33 |
| | | | 717/110 |
| 2015/0348315 A1* | 12/2015 | Wang | G06V 10/56 |
| | | | 345/426 |
| 2015/0348316 A1* | 12/2015 | Porcino | G06T 15/04 |
| | | | 345/426 |
| 2017/0061635 A1* | 3/2017 | Oberheu | G06T 7/586 |
| 2017/0091906 A1* | 3/2017 | Liang | G06T 7/11 |
| 2017/0116739 A1* | 4/2017 | Jeong | G06T 7/44 |
| 2017/0358120 A1* | 12/2017 | Ambrus | G06T 13/20 |
| 2018/0018812 A1* | 1/2018 | Stall | G06T 15/50 |
| 2018/0053343 A1* | 2/2018 | Ren | G06T 11/001 |
| 2018/0150207 A1* | 5/2018 | Drappeau | G06F 3/04845 |
| 2018/0349008 A1* | 12/2018 | Manzari | H04N 23/64 |
| 2019/0080508 A1* | 3/2019 | Johnson | H04N 23/631 |
| 2019/0272663 A1* | 9/2019 | Bar-Zeev | G06T 15/50 |
| 2019/0311528 A1 | 10/2019 | Harrington et al. | |
| 2019/0356837 A1* | 11/2019 | Bakshi | H04N 7/142 |
| 2020/0082201 A1* | 3/2020 | Kim | G06V 10/50 |
| 2022/0137799 A1* | 5/2022 | Chashchin | G06F 40/186 |
| | | | 715/765 |

OTHER PUBLICATIONS

International Application No. PCT/IB2022/056077, International Search Report and Written Opinion, mailed Oct. 5, 2022.
Samsung SM-R365 User Manual (Sep. 2017).
Zibreg, A closer look at iOS7 parallax effect, iDownloadBlog.com, downloaded from the Internet at: <http://www.idownloadblog.com/2013/06/28/ios-7-parallax-effect-explained/. (published Jun. 28, 2013).

* cited by examiner

TECHNOLOGIES FOR RENDERING ITEMS AND ELEMENTS THEREOF WITHIN A DESIGN STUDIO

CROSS-REFERENCE TO RELATED APPLICATIONS

This application claims priority to U.S. Patent Application No. 63/216,057, filed Jun. 29, 2021 and entitled "Studio Rendering of Materials," the disclosure of which is hereby incorporated by reference in its entirety.

FIELD

The present disclosure is directed to improvements designed to solve problems peculiarly to the user interface of an electronic device, and in particular, to rendering items within a user interface. More particularly, the present disclosure is directed to technologies for dynamically rendering items within a user interface using lighting effects based on sensor data.

BACKGROUND

Individuals or customers frequently purchase or order products or items for certain applications or uses. For example, an individual may order customized printed products such as brochures and business cards associated with a business. Conventionally, individuals seeking to purchase or order items from a company or business through an e-commerce platform such as a website or software application, encounter problems particular to these channels or platforms.

It is known that final product visualization is important to the customer experience during product ordering. However, replicating a product visualization that is accurate and lifelike on an e-commerce platform has heretofore presented unique challenges. For example, e-commerce platforms are not able to render, in a lifelike manner in a user interface, customized business cards to be reviewed by customers. As another example, e-commerce platforms generally do not enable a user to view a product with accurate, lifelike visualization effects within an editable environment, which prevents users from editing a design and seamlessly viewing how an edited design will appear on the product. Thus, customers may not be readily inclined to finalize orders, and businesses may not fully realize product sales.

Accordingly, there is an opportunity for platforms and techniques to render physical products in more accurate and lifelike manner for review by customers.

SUMMARY

In an embodiment, a computer-implemented method for rendering an item is provided. The computer-implemented method may be performed by one or more processors, and may include: initiating, on a display of an electronic device, a user interface for displaying a rendering of the item; detecting a location of a pointer on the user interface, the pointer controllable by a user of the electronic device; configuring a lighting effect simulating a virtual light source by setting a position of the virtual light source to the location of the pointer; generating the rendering of the item by applying the lighting effect to at least a portion of a digital image of the item; and displaying the rendering in the user interface.

In another embodiment, an electronic device for rendering an item is provided. The electronic device may include a display, a memory storing non-transitory computer-executable instructions, and one or more processors interfacing with the display and the memory. The one or more processors may be configured to execute the non-transitory computer-executable instructions to cause the one or more processors to: initiate, on a display of an electronic device, a user interface for displaying a rendering of the item; detect a location of a pointer on the user interface, the pointer controllable by a user of the electronic device; configure a lighting effect simulating a virtual light source by setting a position of the virtual light source to the location of the pointer; generate the rendering of the item by applying the lighting effect to at least a portion of a digital image of the item; and display the rendering in the user interface.

Further, in an embodiment, a non-transitory computer-readable storage medium having stored thereon a set of instructions, executable by one or more processors, for rendering an item is provided. The set of instructions may include: instructions for initiating, on a display of an electronic device, a user interface for displaying a rendering of the item; instructions for detecting a location of a pointer on the user interface, the pointer controllable by a user of the electronic device; instructions for configuring a lighting effect simulating a virtual light source by setting a position of the virtual light source to the location of the pointer; instructions for generating the rendering of the item by applying the lighting effect to at least a portion of a digital image of the item; and instructions for displaying the rendering in the user interface.

DETAILED DESCRIPTION

Figure 1:
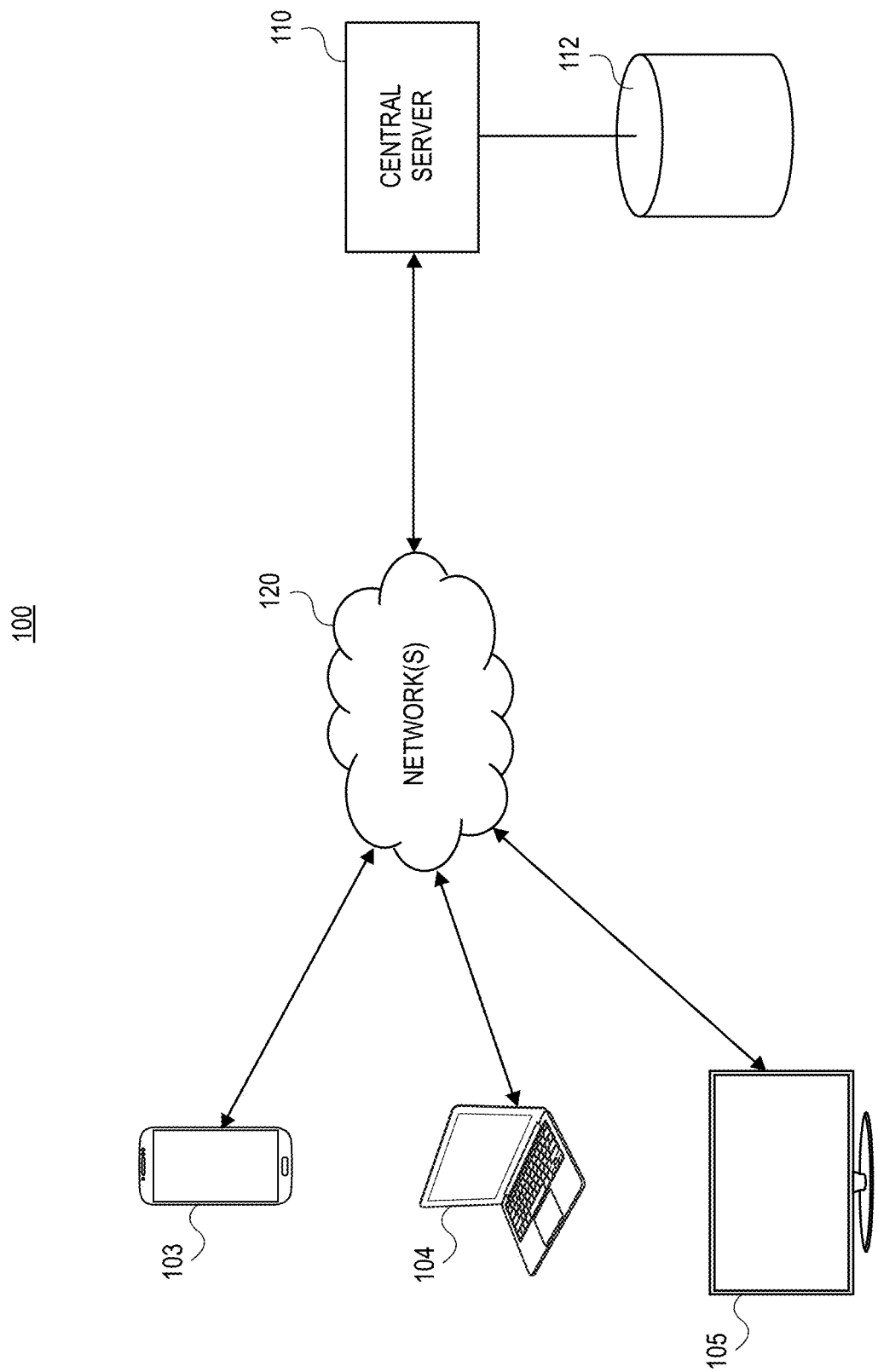
FIG. 1 depicts an overview of components and entities associated with the systems and methods, in accordance with some embodiments.

The present embodiments may relate to, inter alia, platforms and technologies for rendering physical items within a user interface in a lifelike manner. According to certain aspects, an individual or customer may use an electronic device to view and edit designs for one or more physical items (e.g., customized business cards) in contemplation of ordering the physical item(s) including the designs. After the individual selects a particular physical item, the electronic device may render the physical item within a user interface, where the rendering may reflect certain sensor data generated by one or more sensors of or communicatively connected to the electronic device. In particular, the user interface may display a rendering of the physical item that includes visual effects generated based on a position of a pointer or cursor (generally, "pointer") on the user interface, where the position of the pointer is determined based on input data from a mouse, trackpad, touchscreen, or other input device that detects two-dimensional motion relative to a surface.

In some implementations, a lighting effect may be applied to a digital image of the product based on the position of the pointer. The lighting effect may simulate a virtual light source, such that the product, or particular design element(s) of the product, is rendered with a reflective, highlighting, and/or shadowing effect as if light emanating from the virtual light source is incident on the product. The lighting effect may be configured such that the virtual light source position corresponds to the position of the pointer within the user interface. To control the lighting effect, a user may move the position of the pointer. Such a lighting effect enables the user to view a product under dynamic light conditions, as the lighting effect is rendered in real-time as the user moves the pointer. Further, different design elements of the product may have different finishes having different textures, colors, reflectivities, etc. (e.g., finishes such as matte, glossy, metallic (e.g., gold) foil, raised inks, etc.). The lighting effect can be rendered differently on each of these finishes, based on the properties of each finish. In this regard, the electronic device supports an augmented reality feature that overcomes existing limitations by effectively enabling a lifelike rendering of the physical item displayed within a user interface of the electronic device.

In implementations in which the electronic device operated by the user is a portable electronic device, the lighting effect may be controlled by movement of the electronic device rather than movement of the pointer. For example, the position of the virtual light source may, instead of being adjustable by the user using the pointer, be fixed (e.g., at a point outside the display of the electronic device). When sensors of the electronic device detect a change in the orientation of the electronic device (e.g., caused by the user rotating or moving the electronic device), the position of the rendering of the product within the user interface changes with respect to the fixed virtual light source. The lighting effect applied to the digital image of the product can then be updated accordingly.

Furthermore, in some implementations, within the same user interface in which the product is rendered including the lighting effect, the electronic device may display user-selectable options for editing design elements (e.g., text, placement of text, images, placements of images, finishes/textures of design elements, etc.). Accordingly, a user can make an edit to a design element of a product displayed in the user interface, and immediately view how the edited design element appears under changing light conditions.

The systems and methods therefore offer numerous benefits. In particular, the augmented reality feature enables a user to view a lifelike rendering of a desired physical item under dynamic light conditions configurable by the user. These features enhance final product visualization and improve the individual's experience and satisfaction when ordering the physical item via the electronic device, as the individual is more assured of the look and feel of the actual physical item. Additionally, the systems and methods improve the operation of the user interface itself, as the user interface generates a more lifelike and realistic rendering of a product by incorporating the location and movement of the pointer that is used to interact with the user interface. The methods described herein thus enable a user interface to render a lighting effect that dynamically responds to movement of the pointer. Further, as will be discussed in further detail below, certain rendering techniques may be applied that require fewer computational resources than others, thus further improving the functioning of a computer utilizing the disclosed techniques. Moreover, companies or entities that offer the physical items for sale may experience increased sales. It should be appreciated that additional benefits are envisioned.

The systems and methods discussed herein address a challenge that is particular to e-commerce. In particular, the challenge relates to a difficulty in accurately assessing a physical item for purchase without being able to physically possess or handle the item. Conventionally, a user previews an item via a user interface of an electronic device, where the item preview merely includes one or more images of the item. However, the image(s) do not enable the user to assess the item in a lifelike manner, in contemplation of purchasing the item. Further, even if visual effects are rendered to improve the visualization of the item, such visual effects are generally rendered in a preview environment that does not also enable the user to edit the item. The systems and methods offer improved capabilities to solve these problems by generating lifelike rendering effects for items based on sensor and/or input data collected from various sensors and/or peripheral input devices of (or in communicative communication with) the electronic device. Such rendering effects can be rendered within a user interface that also enables users to select design elements of items, edit the design elements, and view the rendering effects as applied to the edited design elements. Further, because the systems and methods employ the collection, analysis, and processing of certain sensor and/or input data, and the communication between and among multiple devices, the systems and methods are necessarily rooted in computer technology in order to overcome the noted shortcomings that specifically arise in the realm of e-commerce.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of electronic devices 103, 104, 105 which may be used or operated by a set of users. Each of the users may be any individual or person who may be interested in purchasing items, products, and/or services that may be offered for sale by a retailer, and/or creating, editing, sharing, and/or saving digital designs for items/products. In an embodiment, the retailer may be associated with an entity such as a corporation, company, partnership, or the like, where the retailer may offer an e-commerce platform (e.g., a website accessible by or an application executable by the electronic devices 103, 104, 105) and optionally a set of brick-and-mortal retail stores. Each of the electronic devices 103, 104, 105 may be any type of electronic device such as a mobile device (e.g., a smartphone), notebook computer, desktop computer, laptop, tablet, phablet, GPS (Global Positioning System) or GPS-enabled device, smart watch, smart glasses, smart bracelet, wearable electronic, PDA (personal digital assistant), pager, computing device configured for wireless communication, and/or the like. Each of the electronic devices 103, 104, 105 may execute or interface with a design application (which may be part of the e-commerce platform) that enables the creating, rendering, sharing, and/or saving of the digital design(s). For example, the design application may enable a user to select a product, select/edit a design of the product, and purchase the product with the edited design.

The electronic devices 103, 104, 105 may communicate with a central server 110 via one or more networks 120. The central server 110 may be associated with the entity that owns and/or manages the e-commerce platform(s) or design application, and/or the set of brick-and-mortal retail stores. In particular, the central server 110 may include or support a web server configured to host a website (e.g., accessible by the electronic devices 103, 104, 105 using a web browser application) that offers various products and/or services for purchase by users and enables users to operate the design application or e-commerce platform. Further, the central server 110 may support a software application executable by the set of electronic devices 103, 104, 105 (i.e., the set of electronic devices 103, 104, 105 may interface with the central server 110 in executing the software application). In embodiments, the network(s) 120 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others).

Although depicted as a single central server 110 in FIG. 1, it should be appreciated that the server 110 may be in the form of a distributed cluster of computers, servers, machines, or the like. In this implementation, the entity may utilize the distributed server(s) 110 as part of an on-demand cloud computing platform. Accordingly, when the electronic devices 103, 104, 105 interface with the server 110, the electronic devices 103, 104, 105 may actually interface one or more of a number of distributed computers, servers, machines, or the like, to facilitate the described functionalities.

The central server 110 may be configured to interface with or support a memory or storage 112 capable of storing various data, such as in one or more databases or other forms of storage. According to embodiments, the storage 112 may store data or information associated with digital designs, formats, templates, and/or design elements for the digital designs and templates, as well as data associated with products for which digital designs may be created/edited and that are offered for sale by the entity that owns and/or manages the e-commerce platform and/or the set of brick-and-mortal retail stores. For example, the storage 112 may store information associated with products such as business cards and notepads, including templates for the business cards/notepads, design elements for the templates, and possibly information associated with a customer or client (e.g., company name and logo). Although three (3) electronic devices 103, 104, 105, and one (1) server 110 are depicted in FIG. 1, it should be appreciated that greater or fewer amounts are envisioned. For example, there may be multiple central servers, each one associated with a different retailer. Additionally, the electronic devices 103, 104, 105 and the central server 110 may interface with one or more separate, third-party servers (not depicted in FIG. 1) to retrieve relevant data and information, including digital designs, templates, design elements, and product information for which digital designs may be created/edited.

According to embodiments, users may select a product to preview, and/or on which to create and/or modify a digital design(s), using the respective electronic devices 103, 104, 105, such as in contemplation of placing an order for a physical version of the product with the digital design applied thereon. The digital design(s) may include at least one digital image or video in various file formats (e.g., JPEG, TIFF, GIF, PNG, Raw, MP4, MOV, etc.), where the digital image(s) or video(s) may depict visual content (i.e., the design itself) that may be composed of one or more design elements. The users may use the respective electronic devices 103, 104, 105 to modify certain elements of the design elements across one or more formats, add textual content to the digital design(s), and select one of more sections and locations within the sections of the product on which to apply the digital design(s).

Further, each of the electronic devices 103, 104, 105 may be configured with (or in communicative connection with) various sensors such as, for example, sensors within a user input device for controlling a pointer, location module (e.g., a GPS chip), an image sensor(s), an accelerometer, a clock, a gyroscope (i.e., an angular rate sensor), a magnetometer, a yaw rate sensor, a tilt sensor, telematics sensors, and/or other sensors.

Depending on the implementation, each of the electronic devices 103, 104, 105 may include or be communicatively coupled to a user input device for controlling a pointer (e.g., a cursor) on a display of the electronic device 103, 104, 105. For example, such a user input device may include a mouse having a wireless or wired connection to the electronic device 103, 104, 105, and having a sensor that detects the two-dimensional motion of the mouse relative to a surface (e.g., using a mechanical ball, light emitting diode (LED) or other photodiode, laser, accelerometer, gyroscope, etc.). Additionally or alternatively, such a user input device may include a trackpad integrated with the electronic device 103, 104, 105 (e.g., such as a trackpad of a laptop). Still further, such an input device may include a touchscreen. The touchscreen may detect the presence of the user's finger, where the position of the user's finger operates as the position of the pointer on the display. As will be further described below (e.g., with respect to FIGS. 3A-3C), sensor data from the user input device may be used to configure a lighting effect used to render an item.

In some implementations, the electronic device 103, 104, 105 may include a gyroscope configured to measure the rate at which the electronic device 103, 104, 105 rotates around a spatial axis(es) (i.e., the angular velocity(ies) of the electronic device 103, 104, 105 around the spatial axis(es)), from which the orientation, and changes in orientation, of the electronic device 103, 104, 105 may be determined. For example, the gyroscope may be a three-axis gyroscope which may generate angular velocity data in each of the three-conventional axes x, y, and z. A gyroscope may also be referred to as an angular rate sensor, angular sensor, or angular velocity sensor. Depending on the implementation, the electronic device 103, 104, 105 may also include an accelerometer configured to measure a degree of linear acceleration, from which the speed of movement of a corresponding object may be determined. The electronic device 103, 104, 105 may also include a magnetometer configured to measure magnetism, which may be used in, for example, a compass application. It should be appreciated that data generated by a gyroscope, an accelerometer, and/or a magnetometer may be analyzed by the electronic device 103, 104, 105 in combination in certain applications or calculations. For example, the electronic device 103, 104, 105 may bias angular velocity data generated by the gyroscope with acceleration data generated by the accelerometer to determine an orientation and movement of the electronic device 103, 104, 105. The terms "gyroscope," "angular rate sensor," "angular sensor," and "angular velocity sensor" may be used throughout this description interchangeably.

Depending on the implementation, a gyroscope, accelerometer, and/or magnetometer may detect sensor data indicative of an orientation of the respective electronic device 103, 104, 105, and the respective electronic device 103, 104, 105 may render the selected item(s) using a lighting effect based on the orientation and optionally on additional sensor data. Additionally, as users reorient the respective electronic devices 103, 104, 105, the respective electronic devices 103, 104, 105 may automatically and dynamically update the renderings according to updated orientations of the electronic devices 103, 104, 105. For example, as mentioned above, a lighting effect may simulate a virtual light source (i) having a fixed position, where the relative position between the rendering of the item in the display and the light source can be changed by changing the orientation of the device, or (ii) having an adjustable position, where the position of the virtual light source may change responsive to a change in position of a pointer on the display.

Whether the position of the virtual light source is fixed or adjustable may depend on the type of electronic device 103, 104, 105 displaying the rendering. For example, if an electronic device is a laptop or desktop or is otherwise not configured to be moved and rotated while in use, then the virtual light source may have an adjustable position controllable by the user using a user input device, such as a mouse or trackpad. If an electronic device is a portable device such as a smartphone, tablet, or other type of device configured to be moved and rotated while in use, then the virtual light source may have a fixed position. In some cases, whether the position of the virtual light source is fixed or adjustable may be configurable by the user. For example, in the case of an electronic device having a touchscreen, a user may be able to select whether the virtual light source has an adjustable position controllable by interacting with the touchscreen, or has a fixed position, where the relative position between the rendering of the item and the virtual light source can be changed by moving the electronic device.

Figure 2:
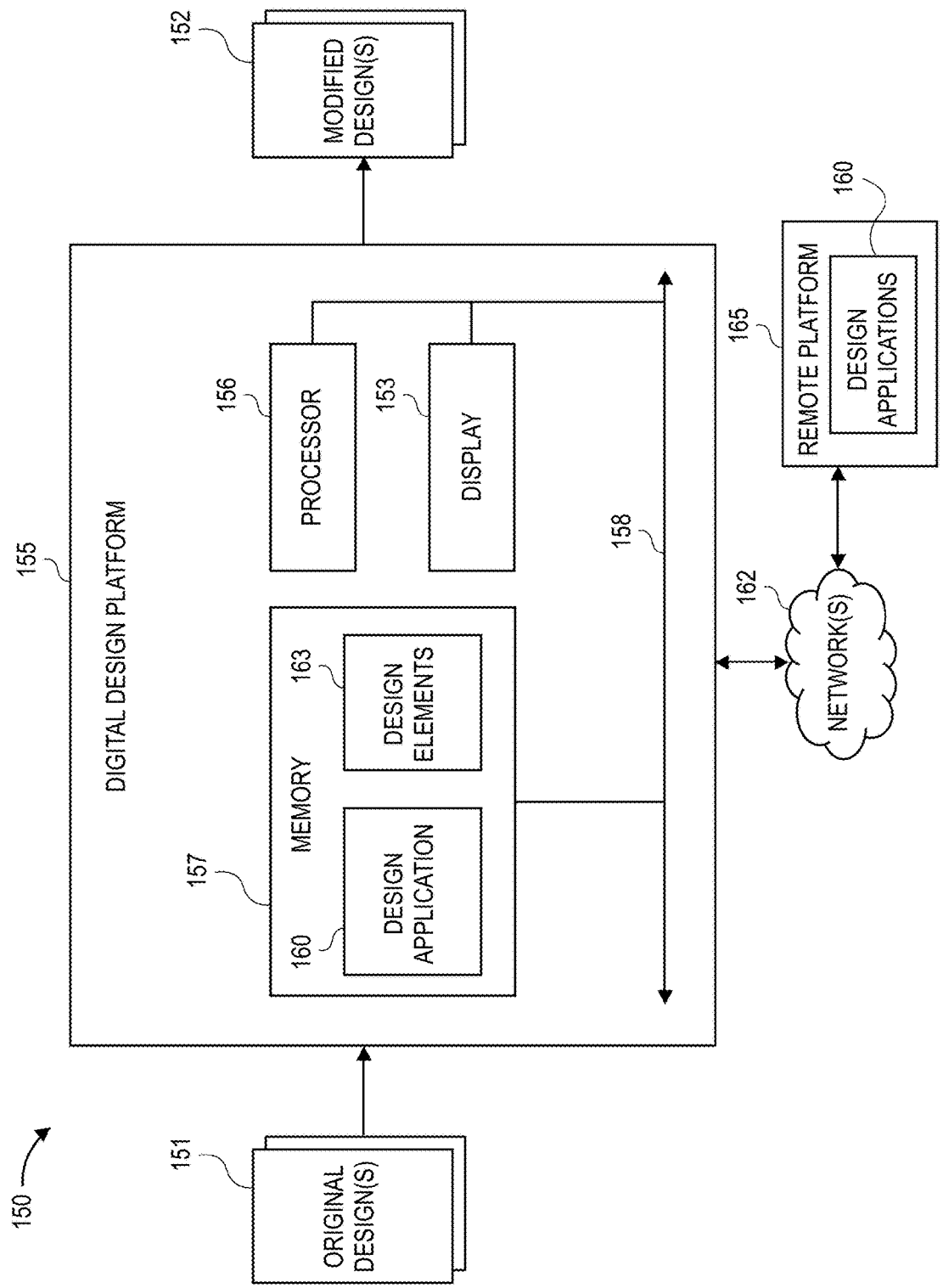
FIG. 2 depicts an overview of certain components configured to facilitate the systems and methods, in accordance with some embodiments.

Turning to FIG. 2, FIG. 2 depicts an example environment 150 in which an original design(s) 151 (e.g., a design for a product) is processed into a modified design(s) 152 via a digital design platform 155, according to some embodiments. As will be discussed below, items may be rendered, including the lighting effects of this disclosure, by the digital design platform 155. The digital design platform 155 may be implemented on any computing device, including one or more of the electronic devices 103, 104, 105, or the server 110 as discussed with respect to FIG. 1. Components of the computing device may include, but are not limited to, a processing unit (e.g., processor(s) 156), a system memory (e.g., memory 157), and a system bus 158 that couples various system components including the memory 157 to the processor(s) 156. In some embodiments, the processor(s) 156 may include one or more parallel processing units capable of processing data in parallel with one another. The system bus 158 may be any of several types of bus structures including a memory bus or memory controller, a peripheral bus, or a local bus, and may use any suitable bus architecture. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

The digital design platform 155 may further include a display 153 configured to present content (e.g., digital designs, renderings of products/items, and components/elements thereof). For example, the display 153 may present user interfaces of a design application 160 of the digital design platform 155. By interacting with the user interfaces presented on the display 153, a user may make selections to the displayed content, such as to modify digital designs (or design elements thereof) presented thereon, choose various selections, and/or the like. The display 153 may be embodied as part of a touchscreen configured to sense touch interactions and gestures by the user. Although not shown, other system components communicatively coupled to the system bus 158 may include input devices (e.g., a user input device as described above) such as a pointer or cursor control device (e.g., a mouse, trackball, touch pad, etc.) and keyboard (not shown). The display 153 may be connected to the system bus 158 via an interface, such as a video interface. In addition to the display 153 (e.g., a monitor or other display device), the computing device may also include other peripheral output devices such as a printer, which may be connected through an output peripheral interface (not shown).

The memory 157 may include a variety of computer-readable media. Computer-readable media may be any available media that can be accessed by the computing device and may include both volatile and nonvolatile media, and both removable and non-removable media. By way of non-limiting example, computer-readable media may comprise computer storage media, which may include volatile and nonvolatile, removable and non-removable media implemented in any method or technology for storage of information such as computer-readable instructions, routines, applications (e.g., the design application 160) data structures, program modules or other data. Computer storage media may include, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the processor 156 of the computing device.

The digital design platform 155 may operate in a networked environment and communicate with one or more remote platforms, such as a remote platform 165, via a network(s) 162, such as a local area network (LAN), a wide area network (WAN), or other suitable network. The platform 165 may be implemented on any computing device, including one or more of the electronic devices 103, 104, 105 or the server 110 as discussed with respect to FIG. 1, and may include many or all of the elements described above with respect to the digital design platform 155. In some embodiments, the design application 160 as will be further described herein may be stored and executed by the remote platform 165 instead of by or in addition to the digital design platform 155.

According to embodiments, the digital design platform 155 (and more particularly, the design application 160) may process or modify the original design(s) 151 to produce the modified design(s) 152. Generally, each of the original design(s) 151 and the modified design(s) 152 may be embodied as any type of electronic document, file, template, etc., that may include a set of design elements or components, each of which may include some type of displayable content (e.g., a combination of textual and/or visual content), and may be stored in memory as program data in a hard disk drive, magnetic disk and/or optical disk drive in the digital design platform 155 and/or the remote platform 165. The digital design platform 155 may support one or more techniques, algorithms, or the like for modifying the original design(s) 151 to generate the modified design(s) 152.

According to embodiments, the original design 151 may represent a product, such as a paper-based item (e.g., business cards, note pads, book, etc.), toy, electronic, clothing or apparel, appliance, baby/kid item, sports/outdoor item, beauty/health product, grocery, home improvement item or tool, handmade item, art piece, instrument, and/or any other physical item. The original design 151 may also include design elements that will be applied to the physical product, and the locations of the design elements on the product. For example, in the case of a product corresponding to a business card, the design elements may include an image or company logo, decorative design element(s), and text elements such as a company name, an individual name, and contact information for the individual. The user may select the original design 151 from a set of templates, may search for the original design 151, or may create the original design 151 from a blank or saved electronic document.

The design application 160 may enable the user to select an original design 151, causing the design application 160 to display a user interface (e.g., a graphical user interface (GUI)) on the display 153 for viewing and editing the original design 151. The design application 160 may enable a user to select, in the user interface, one or more digital content items as well as textual content to add to the original design 151, and to edit existing digital content items and textual content included in the original design 151. According to embodiments, a digital content item may comprise any combination of visual content and alphanumeric text, and may be, for example, a logo, an image, a design, or the like. The digital content item may have a content width and a content height, and may be accessed from a set of design elements 163 stored by the memory 157. Further, the design application 160 may enable the user to select a section of the original design 151 or a cell or other portion of a layout of the original design 151 at which to position a given digital content item. For example, the user interface may enable a user to select existing design elements of the original design 151, add new design elements, and edit design elements (e.g., by inserting or editing text, inserting or editing images, changing the location of text and/or images, changing colors of design elements, adding or changing finishes of design elements).

Further, when the design application 160 renders the original design in the user interface (i.e., the same user interface in which the user can select and edit design elements), the design application 160 can render the original design 151 using the visualization effects discussed herein, such as the lighting effect controllable by a user input device and/or by changing the orientation of the computing device. When an edit to the original design 151 is received by the design application 160, the design application 160 can modify the original design 151 accordingly, and render the modified original design 151 using the visualization effects.

According to embodiments, when the original design(s) 151 is created and/or modified, the digital design platform 155 may output the modified design(s) 152. As noted above, the modified design(s) 152 may be displayed in the user interface on the display 153. The digital design platform 155 may store the modified design(s) 152 in the memory 157 or other storage, and/or may transmit the modified design(s) 152 to other components or entities for display, sharing, further transmission, and/or the like.

Further, according to embodiments, the digital design platform 155 may support placing an order for a physical version of the digital design. After a digital design is modified, for example, a user may interact with a user interface of the design application 160 to make selections pertaining to an order (e.g., quantity, shipping information, payment information, contact information, etc.), which may interface with a server (e.g., the central server 110) to complete the order according to the order information. Accordingly, the user may interact with the digital design platform 155 to review the item in a lifelike simulation with various rendering effects within an user interface prior to deciding whether to purchase the item.

Although the embodiments discussed herein primarily describe the computing device on which the user interfaces are displayed (i.e., the computing device implementing the digital design platform 155, which may be the electronic device 103, 104, 105, for example) as processing sensor data (e.g., from a user input device and/or from a gyroscope, accelerometer, magnetometer) and generating the renderings, it should be appreciated that the backend server (e.g., the central server 110 as discussed with respect to FIG. 1) may alternatively process the sensor data, generate the renderings, and facilitate communications with the computing device. In operation, the computing device on which the user interfaces are displayed may transmit any captured sensor data to the backend server, where the backend server may process the captured sensor data and generate the renderings with the applied rendering effect(s). Additionally, the backend server may transmit the corresponding display data to the computing device for display on the display 153. The computing device may transmit any updated sensor data, and the backend server may accordingly process the updated sensor data, in real-time or near-real-time as the updated sensor data is captured, so that the display 153 may display the rendered item according to the real-time or near-real-time orientation of the computing device.

Figure 3A:
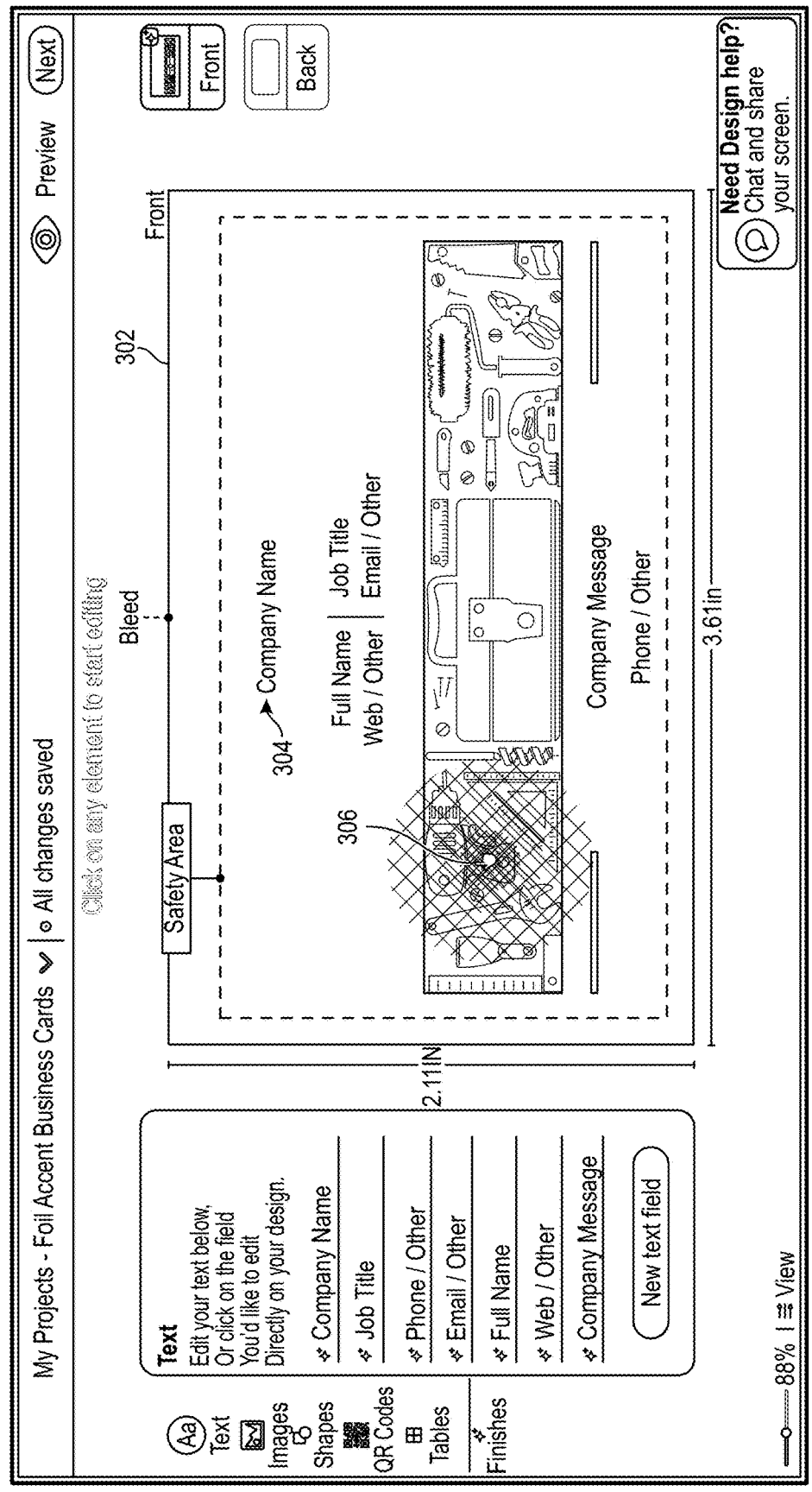
FIGS. 3A-3C depict example user interfaces used to render an item, each example user interface having a virtual light source in a different position.
Figure 3B:
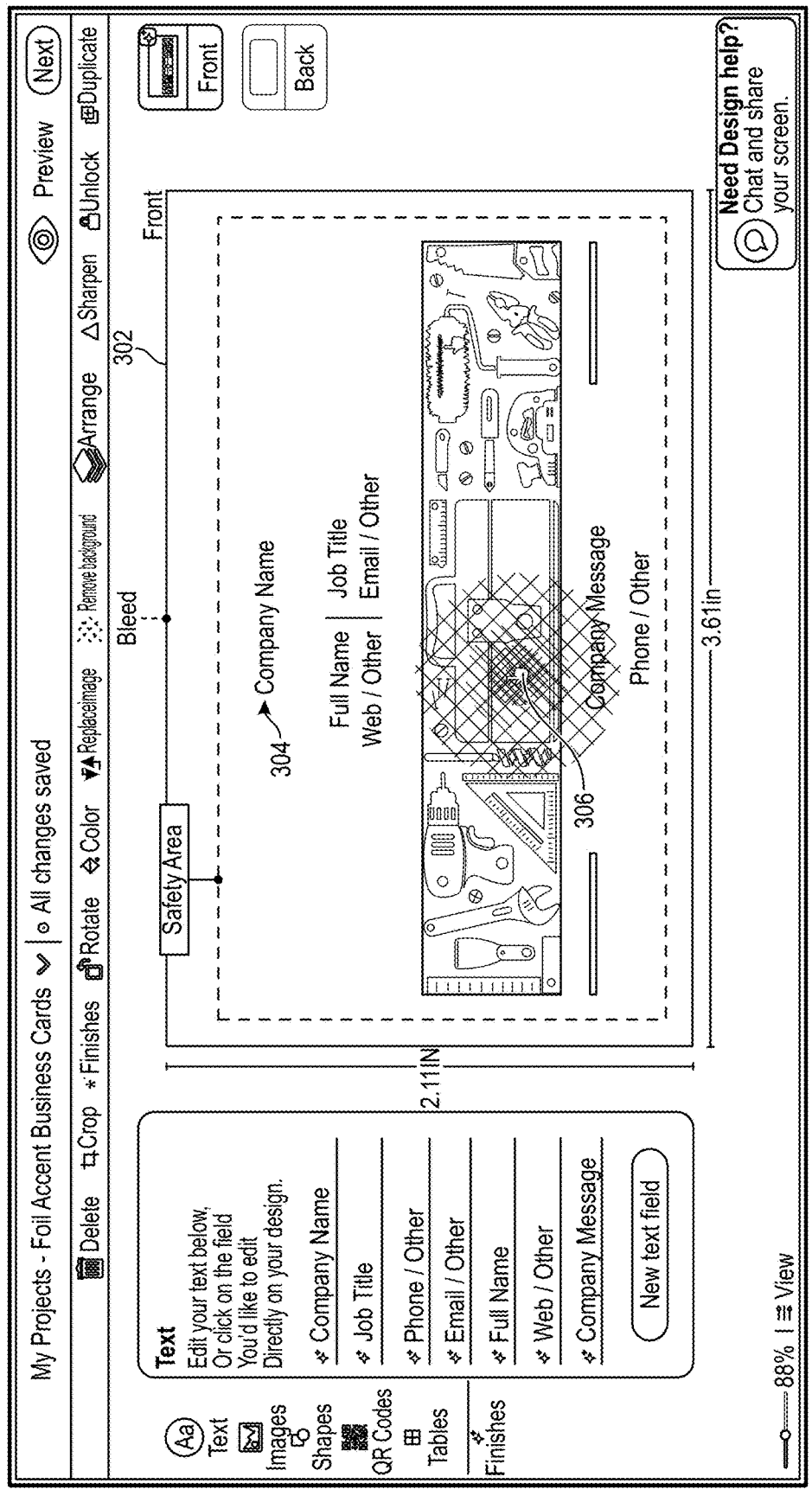
Figure 3C:
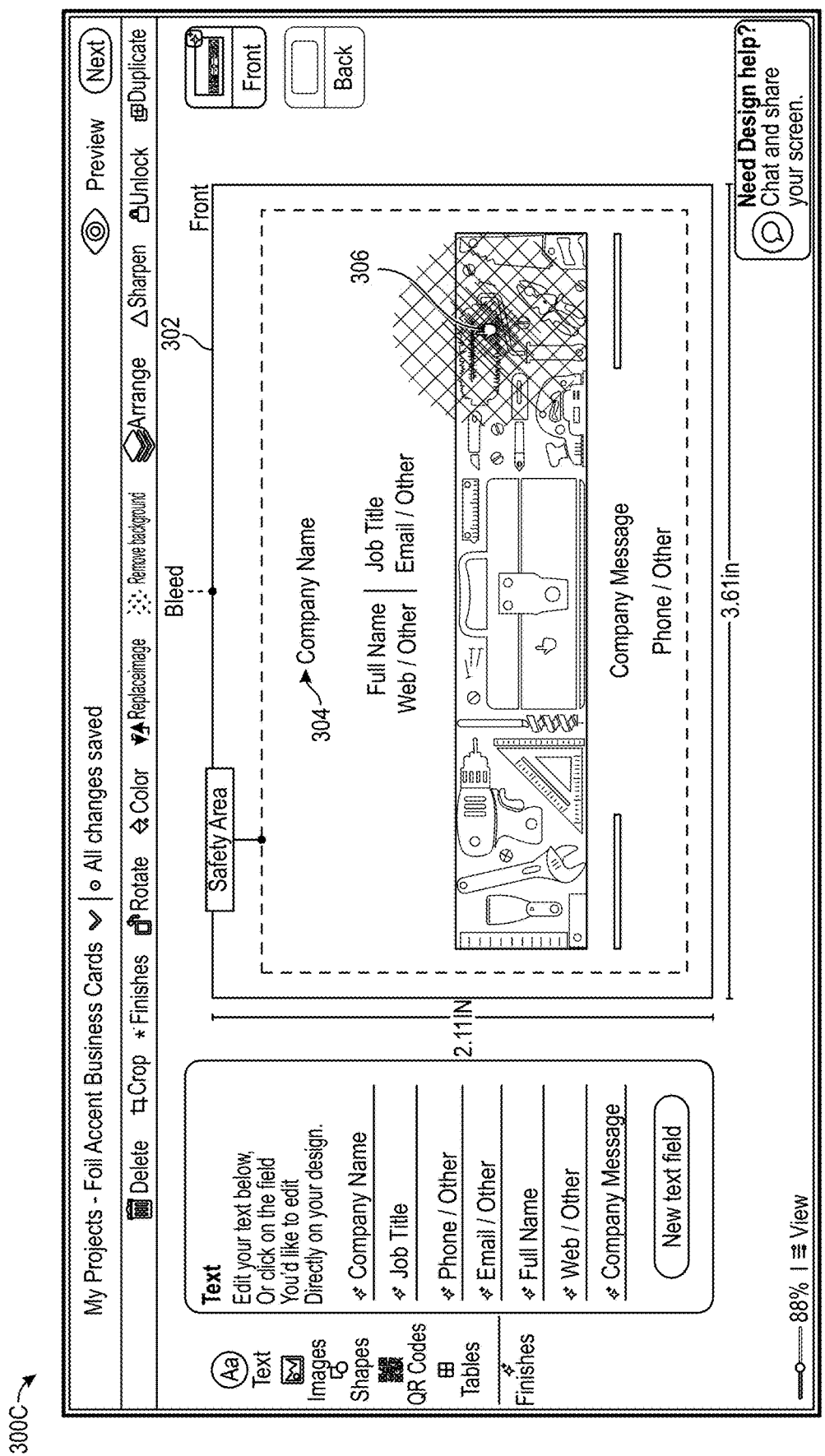

FIG. 3A-3C illustrate example user interfaces associated with a digital design platform (e.g., the digital design platform 155), where the digital design platform may support a design application (such as the design application 160). The example user interfaces, thus, may be example user interfaces of the design application. An electronic device (e.g., the computing device implementing the digital design platform 155, the electronic device 103, 104, 105, and/or the server 110) may execute the design application and display the example user interfaces in a display and receive selections associated with the example user interfaces via input/output (I/O) devices of, or communicatively connected to, the electronic device.

FIG. 3A depicts an example user interface 300A associated with displaying a rendering 302 of an item viewable by a user. In embodiments, an electronic device (e.g., the electronic device 103, 104, 105) may display the user interface 300A in response to a user selecting, in another user interface, an original design (e.g., the original design 151) for an item. The user may select the original design in order to view the original design, edit the original design, and potentially place an order for a physical item having the original design. In the example user interface 300A, the item is a business card. The user, interacting with the design application, may select an original design for the business card, which may cause the design application to display the rendering 302 of the business card in the user interface 300A. The business card may be rendered using a digital image of the business card, including design elements of the original design (i.e., including text and images, such as the tool images shown in FIG. 3A). For example, the business card may include a company name text element 304. A user can select the company name text element 304, and edit the company name text element (e.g., to change the text, change the location of the text on the business card, change the color, finish, font type, font size of the text, delete the text, etc.). Similarly, a user can also select other text elements (e.g., "Full Name," "Job Title," "Web/Other," "Email/Other," "Company Message," and "Phone/Other") and edit/remove these text elements. Still further, a user can select design elements such as a set of tool images or icons (e.g., the ruler, wrench, drill, tool box, paint roller, saw, etc.) or lines beneath the tool images, and edit/remove design elements, and/or add additional design elements to the business card.

The electronic device may generate the rendering 302 of the business card by applying various visualization effects to the digital image of the business card. Further, each visualization effect can be applied to different portions of the business card differently, depending on the properties of the portion. For example, visualization effects can be applied to different design elements individually, such as based on the finishes, textures, colors, and/or individual properties of the design elements.

As noted above, a visualization effect that may be included in the rendering 302 may include a lighting effect. The lighting effect simulates a virtual light source at a configurable location, such that the rendering 302 of the business card includes reflections, highlighting, and/or shadowing effects simulating the presence of the virtual light source at the configurable location. In the example of FIG. 3A, the position of the virtual light source corresponds to the position of a pointer 306 on the user interface 300A. According to embodiments, the position of the pointer 306 is adjustable according to a user input device (e.g., a mouse, trackpad, trackball, or touchscreen, as noted above) that may be operated or maneuvered by the user. Accordingly, the design application detects the position of the pointer 306, and configures the lighting effect by setting the location of the virtual light source to the position of the pointer 306. In the user interface 300A, the pointer 306 is located on image of the drill, causing the lighting effect to simulate a virtual light source positioned at the image of the drill. In particular, as illustrated in FIG. 3A, the lighting effect is represented using cross-hatching. The cross-hatching is denser in areas that appear lighter (i.e., highlighted) relative to other areas. For example, the image of the drill appears lighter (i.e., highlighted) than other images or elements included in the rendering 302. It should be appreciated that the electronic device may apply other visualization effects, as discussed herein.

FIG. 3B depicts a user interface 300B similar to the user interface 300A, except that the position of the pointer 306 has moved to the center of the business card. Accordingly, the design application detects the updated position of the pointer 306, and configures the lighting effect by setting the location of the virtual light source to the new position of the pointer 306. In the user interface 300B, the pointer 306 is located on the image of the tool box, causing the lighting effect to simulate a virtual light source positioned at the image of the tool box. In particular, as illustrated in FIG. 3A, the image of the tool box (and specifically, the left side of the tool box) appears lighter (i.e., highlighted) than other images or elements included in the rendering 302 (represented by denser cross-hatching at the location of the pointer 306). Additionally, by virtue of the position of the pointer 306 moving from its position in FIG. 3A to its position in FIG. 3B, the image of the drill in FIG. 3B is no longer lighter (i.e., highlighted) than other images or elements included in the rendering 302. That is, the electronic device may dynamically apply visualizations, as well as dynamically cease applying visualizations, to different images or elements based on the movement of the pointer 306, which simulates movement of the virtual light source.

Likewise, FIG. 3C depicts a user interface 300C similar to the user interfaces 300A, 300B, except that the position of the pointer 306 has moved to the right of the business card, on the image of the paint roller. Accordingly, the design application detects the updated position of the pointer 306, and configures the lighting effect by setting the location of the virtual light source to the new position of the pointer 306. As a user moves the pointer 306, the lighting effect is continuously reconfigured such that the position of the virtual light source moves with the pointer 306. Said another way, the lighting effect is dynamically reconfigured in real time or near-real time to reflect movement of the pointer 306. Thus, the user interfaces 300A-300C may represent the same user interface with different positions of the virtual light source to reflect the position of the pointer 306 (as controlled by the user) moving from the left to the right across the display.

To apply the lighting effect to an item (i.e., to a digital image including the various design elements of the design of the item), the design application can use one or more techniques. The design application can apply the techniques (i) to an entirety of the design of the product, (ii) to a portion of the design of the product (e.g., to a particular design element), (iii) or to multiple portions of the design of the product (e.g., to multiple respective design elements). How each design element is rendered, using the lighting effect, can depend on properties of the design element, such as color and finish. Further, the effect of the lighting effect on portions of the item can depend on characteristics of the item itself (e.g., angles, surfaces, corners, edges, etc.). It should be appreciated that while the term "digital image" is utilized, the digital image to which a lighting effect is applied may be associated with a two-dimensional (2D) model of the item, or a three-dimensional (3D) model of the item.

An example technique to apply the lighting effect is to apply a scalable vector graphics (SVG) filter to the digital image. Applying the SVG filter may include performing ray tracing, including calculating, for simulated light rays emanating at a point light source (i.e., the virtual light source), the path that the light rays will travel, and the corresponding effect the light rays will have on a surface of the item. An SVG filter can then be applied to the digital image to apply, for each pixel, the calculated effect to the portion of the item corresponding to the pixel. Accordingly, in the examples illustrated by FIGS. 3A-3C, if an SVG filter is utilized, as the pointer 306 moves, the SVG filter is recalculated based on the location of the pointer 306, such that the virtual light source is located at the position of the pointer 306, and applied to the digital image of the item to generate the rendering 302.

Figure 4:
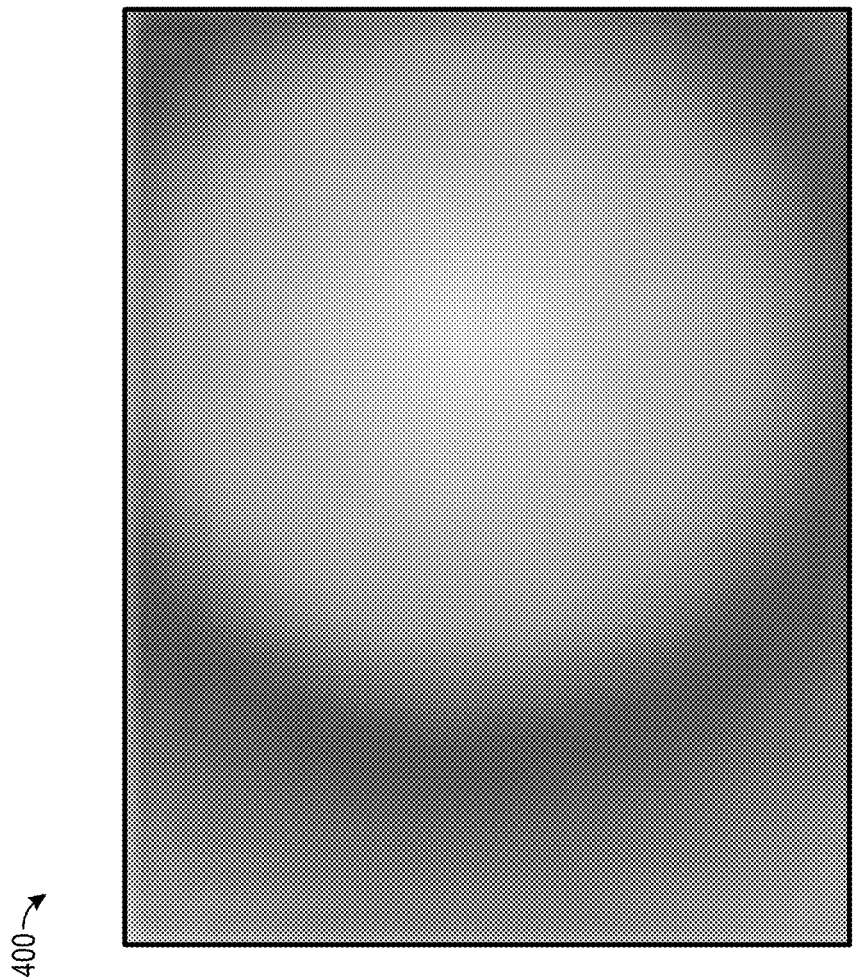
FIG. 4 depicts an example circular gradient used to generate a lighting effect, in accordance with some embodiments.

Additionally or alternatively, another example technique to apply the lighting effect is to overlay a mask onto the digital image of the item. Mask image(s) may be stored, for example, in the memory 157. A mask may simulate the effect of the virtual light source. For example, the mask may include a gradient (i.e., a pattern of shading) that represents light and dark regions, as would be produced by a point light source. An example mask corresponding to a circular gradient is shown in FIG. 4. The center of the circular gradient, at which the highlighting effect is the brightest, corresponds to the location of the point light source. Accordingly, in the examples illustrated by FIGS. 3A-3C, if the mask technique is utilized, as the pointer 306 moves, a mask is applied to the digital image such that a center of the circular gradient (i.e., the position of the virtual light source) is located at the position of the pointer 306. Each mask image may have the same dimensions as the item, such that the mask image aligns with the digital image of the item, or the mask image may be adjusted to conform to the shape/size of the item. Accordingly, in some embodiments, several mask images may be needed, each mask image having a center of the circular gradient at a different location. As the pointer 306 moves, different mask images are applied to the item, where each mask image is selected to align the pointer 306 location (i.e., the virtual light source position) with a center of a circular gradient. Additionally or alternatively, a single mask image may be modified or re-generated for each new position of the pointer 306. Use of a mask technique may require reduced computational resources (i.e., fewer calculations) relative to use of an SVG filter in which ray paths are calculated. Accordingly, to reduce computational resources, a mask technique, or a combination of a mask technique and an SVG filter, may be utilized rather than an SVG filter alone.

Depending on the embodiment, to apply the lighting effect, the design application may utilize an SVG filter, a mask such as a circular gradient (also referred to as a radial gradient), a mask having a non-circular gradient, another technique, or a combination of these techniques. To simulate the virtual light source, the lighting effect may include a highlight effect, a reflection effect, a shadowing effect, or any suitable effect indicating the presence of a simulated, virtual light source. For example, the lighting effect may include a reflection effect to simulation a reflection(s) on a portion(s) of the item (e.g., on particular design elements), and/or a shadow effect to simulate a shadow(s) on the surface of the item (e.g., on or around a particular design element, such as shadowing to indicate a text element having a raised print). Generally speaking, the lighting effect is used to create a lifelike effect on a rendered item that simulates how the item will appear under actual lighting conditions.

While the examples of this disclosure focus on a virtual light source having an adjustable position controllable by a user operating a user input device to control a pointer (e.g., the pointer 306), it should be understood that, in other embodiments, the virtual light source may have a fixed position. In such embodiments, by altering the orientation of the electronic device, a user can change the relative position between the item (rendered in the plane of the display of the electronic device) and the fixed light source. The lighting effect can then be re-calculated accordingly. A processor of the electronic device can detect changes in orientation based on sensor data (e.g., angular rate data, angular velocity data, acceleration data) received from a gyroscope and/or accelerometer of the electronic device.

Figure 5:
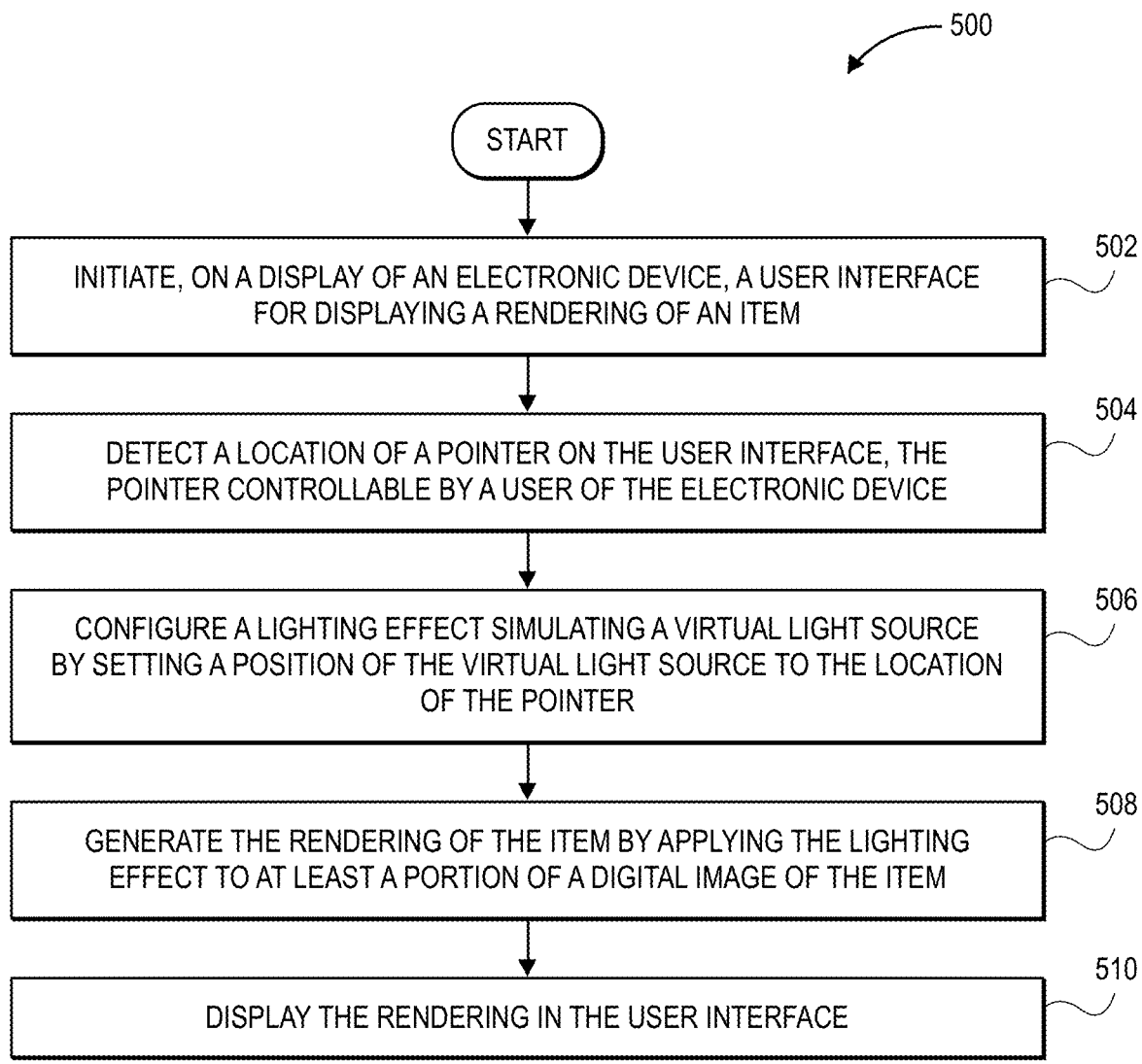
FIG. 5 depicts an example flow diagram associated with rendering an item within a user interface.

FIG. 5 depicts is a block diagram of an example method 500 for rendering an item within a user interface. The method 500 may be facilitated by an electronic device (such as the electronic device 103, 104, 105 as discussed with respect to FIG. 1, which may be included in the digital design platform 155 described above with respect to FIG. 2) that may be in communication with a server (such as the central server 110 as discussed with respect to FIG. 1).

The method 500 may begin when the electronic device initiates (block 502), on a display (e.g., the display 153) of the electronic device, a user interface (e.g., the user interface 300A, 300B, 300C) for displaying a rendering of an item (e.g., the rendering 302). In embodiments, a user of the electronic device may select to initiate the user interface, such as by browsing for the item on an e-commerce platform and selecting to view the item and edit a design of the item (e.g., by selecting to view and edit the original design 151). For example, the user interface may be a user interface of a design application (e.g., the design application 160), which may be accessible using a web browser application implemented at the electronic device.

As part of rendering the item, the electronic device may detect (block 504) a location of a pointer (e.g., the pointer 306) on the user interface. The pointer may be controllable by a user of the electronic device (e.g., by using a user input device, such as a mouse, trackball, trackpad, or touchscreen). The electronic device may receive sensor or positioning data indicating the location of the pointer from a user input device, determine the location of the pointer based on the sensor or positioning data, and update the user interface to reflect the movement of the pointer to the location indicated by the sensor or positioning data.

The electronic device may configure (block 506) a lighting effect simulating a virtual light source by setting a position of the virtual light source to the location of the pointer. The electronic device can then generate (block 508) the rendering of the item by applying the lighting effect to at least a portion of a digital image of the item, and display (block 510) the rendering in the user interface. In some implementations, the electronic device may apply the lighting effect to the digital image based on a finish (i.e., a simulated finish) of the item. For example, a portion of the digital image corresponding to a portion of the item (which may be a specific design element, such as a text element) may have a particular finish. The lighting effect may be applied to the particular finish in accordance with various properties, such as texture, reflectivity, and color, of the finish, such that the lighting effect simulates how the finish would appear on the actual physical item. The lighting effect may be applied to different portions of the digital image (which may correspond to different design elements) separately. For example, the electronic device may apply the lighting effect to a first portion of the digital image based on a first finish of the first portion of the item corresponding to the first portion of the digital image, and apply the lighting effect to a second portion of the digital image based on a second finish of a second portion of the item corresponding to the second portion of the digital image.

The lighting effect can be dynamically re-configured in real-time or near-real time depending on the location of the pointer. For example, the electronic device may detect that the pointer has moved to a new location on the user interface. The electronic device can then re-configure the lighting effect by setting the position of the virtual light source to the new location, update the rendering of the item by applying the re-configured lighting effect to the digital image (e.g., to at least a portion of the digital image of the item), and display the rendering in the user interface. Accordingly, as the user interacts with a user input device to change the location of the pointer, the lighting effect can be re-configured and re-applied to the rendering of the item in the user interface.

Depending on the embodiment, applying the lighting effect can include utilizing one or more techniques. For example, to generate the rendering, the electronic device may apply the lighting effect to (a portion of) the digital image using an SVG filter. Additionally or alternatively, to generate the rendering, the electronic device may apply the lighting effect to (a portion of) the digital image by: generating a mask representing a circular gradient (e.g., the circular gradient illustrated in FIG. 4) having a center positioned at the position of the virtual light source, and overlaying the mask on (the portion of) the digital image.

Further, a user may also interact with the user interface to edit design elements of the item. The electronic device may receive, via the user interface, an edit to a design element of the item, and update the digital image of the item to include the edit to the design element (e.g., an edit to the company name text element 304). In response to the edit, the electronic device may generate an updated rendering of the item by applying the lighting effect to (a portion of) the updated digital image having the edit. The electronic device can then display the updated rendering in the user interface.

Figure 6:
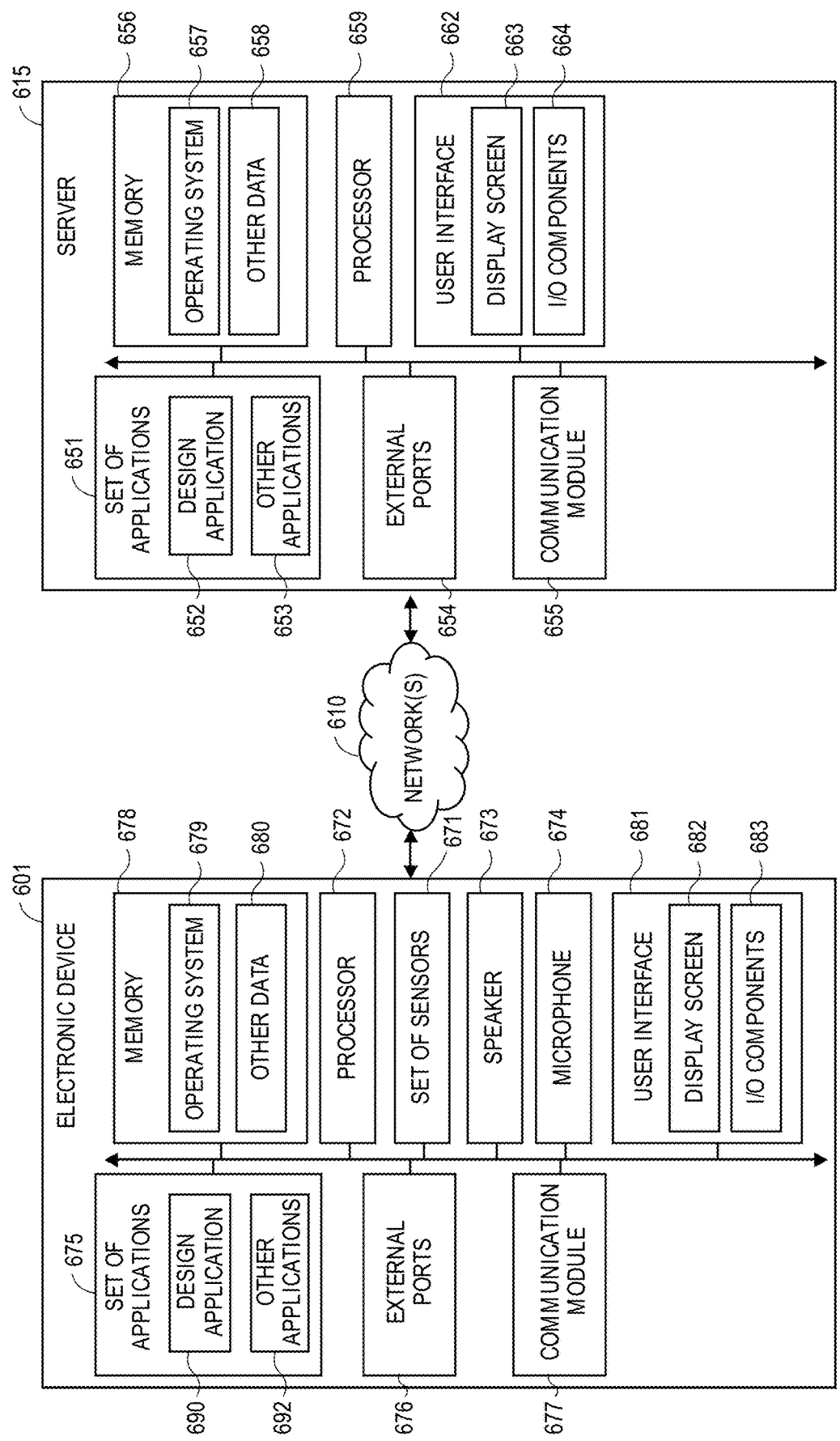
FIG. 6 is a block diagram of an example electronic device and an example server, in accordance with some embodiments.

FIG. 6 illustrates a hardware diagram of an example electronic device 601 (e.g., one of the electronic devices 103, 104, 105 as discussed with respect to FIG. 1) and an example server 615 (e.g., the server 110 as discussed with respect to FIG. 1), in which the functionalities as discussed herein may be implemented.

The electronic device 601 may include a processor 672 as well as a memory 678. The memory 678 may store an operating system 679 capable of facilitating the functionalities as discussed herein as well as a set of applications 675 (i.e., machine readable instructions). For example, one of the set of applications 675 may be a design application 690, such as a virtual design studio.

The processor 672 may interface with the memory 678 to execute the operating system 679 and the set of applications 675. According to some embodiments, the memory 678 may also store other data 680 that may include digital content items and related design elements. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 601 may further include a communication module 677 configured to communicate data via one or more networks 610. According to some embodiments, the communication module 677 may include one or more transceivers (e.g., WAN, WWAN, WLAN, and/or WPAN transceivers) functioning in accordance with IEEE standards, 3GPP standards, or other standards, and configured to receive and transmit data via one or more external ports 676.

The electronic device 601 may include a set of sensors 671 such as, for example, a location module (e.g., a GPS chip), an image sensor, an accelerometer, a clock, a gyroscope (i.e., an angular rate sensor), a compass, a yaw rate sensor, a tilt sensor, telematics sensors, and/or other sensors. The electronic device 601 may further include a user interface 681 configured to present information to a user and/or receive inputs from the user. As shown in FIG. 6, the user interface 681 may include a display screen 682 and I/O components 683 (e.g., user input device, ports, capacitive or resistive touch sensitive input panels, keys, buttons, lights, LEDs, and/or built in or external keyboard). According to some embodiments, the user may access the electronic device 601 via the user interface 681 to input design selections and/or perform other functions. Additionally, the electronic device 601 may include a speaker 673 configured to output audio data and a microphone 674 configured to detect audio.

In some embodiments, the electronic device 601 may perform the functionalities as discussed herein as part of a "cloud" network or may otherwise communicate with other hardware or software components within the cloud to send, retrieve, or otherwise analyze data.

As illustrated in FIG. 6, the electronic device 601 may communicate and interface with the server 615 via the network(s) 610. The server 615 may include a processor 659 as well as a memory 656. The memory 656 may store an operating system 657 capable of facilitating the functionalities as discussed herein as well as a set of applications 651 (i.e., machine readable instructions). For example, one of the set of applications 651 may be a design application 652 (e.g., the design application 160) such as a virtual design studio. It should be appreciated that one or more other applications 653 are envisioned.

The processor 659 may interface with the memory 656 to execute the operating system 657 and the set of applications 651. According to some embodiments, the memory 656 may also store other data 658 such as data associated with the design application 652. The memory 656 may include one or more forms of volatile and/or nonvolatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 615 may further include a communication module 655 configured to communicate data via the one or more networks 610. According to some embodiments, the communication module 655 may include one or more transceivers (e.g., WAN, WWAN, WLAN, and/or WPAN transceivers) functioning in accordance with IEEE standards, 3GPP standards, or other standards, and configured to receive and transmit data via one or more external ports 654.

The server 615 may further include a user interface 662 configured to present information to a user and/or receive inputs from the user. As shown in FIG. 6, the user interface 662 may include a display screen 663 and I/O components 664 (e.g., ports, capacitive or resistive touch sensitive input panels, keys, buttons, lights, LEDs, external or built in keyboard). According to some embodiments, the user may access the server 615 via the user interface 662 to review information, make selections, and/or perform other functions.

In some embodiments, the server 615 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 672, 659 (e.g., working in connection with the respective operating systems 679, 657) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical.

The following list of examples reflects a variety of the embodiments explicitly contemplated by the present disclosure:

Example 1. A computer-implemented method for rendering an item, the method comprising: initiating, by one or more processors, on a display of an electronic device, a user interface for displaying a rendering of the item; detecting, by the one or more processors, a location of a pointer on the user interface, the pointer controllable by a user of the electronic device; configuring, by the one or more processors, a lighting effect simulating a virtual light source by setting a position of the virtual light source to the location of the pointer; generating, by the one or more processors, the rendering of the item by applying the lighting effect to at least a portion of a digital image of the item; and displaying, by the one or more processors, the rendering in the user interface.

Example 2. The computer-implemented method of example 1, wherein the location of the pointer is a first location, the method further comprising: detecting, by the one or more processors, a second location of the pointer on the user interface, the second location different from the first location; re-configuring, by the one or more processors, the lighting effect by setting the position of the virtual light source to the second location; updating, by the one or more processors, the rendering of the item by applying the re-configured lighting effect to the at least a portion of the digital image; and displaying, by the one or more processors, the updated rendering in the user interface.

Example 3. The computer-implemented method of example 1 or 2, wherein generating the rendering includes: applying the lighting effect to the at least a portion of the digital image using a scalable vector graphics (SVG) filter.

Example 4. The computer-implemented method of any one of examples 1-3, wherein generating the rendering includes: applying the lighting effect to the at least a portion of the digital image by: generating a mask representing a circular gradient having a center positioned at the position of the virtual light source; and overlaying the mask on the at least a portion of the digital image.

Example 5. The computer-implemented method of any one of examples 1-4, further comprising: receiving, by the one or more processors, via the user interface, an edit to a design element of the item; updating, by the one or more processors, the digital image of the item to include the edit to the design element; generating, by the one or more processors, an updated rendering of the item by applying the lighting effect to at least a portion of the updated digital image; and displaying, by the one or more processors, the updated rendering in the user interface.

Example 6. The computer-implemented method of any one of examples 1-5, wherein generating the rendering includes: applying the lighting effect to the at least a portion of the digital image based on a simulated finish of a portion of the item corresponding to the at least a portion of the digital image.

Example 7. The computer-implemented method of any one of examples 1-6, wherein generating the rendering includes: applying the lighting effect to a first portion of the digital image based on a first finish of a first portion of the item corresponding to the first portion of the digital image; and applying the lighting effect to a second portion of the digital image based on a second finish of a second portion of the item corresponding to the second portion of the digital image.

Example 8. The computer-implemented method of any one of examples 1-7, wherein initiating the user interface includes: initiating the user interface using a web browser application implemented at the electronic device.

Example 9. The computer-implemented method of any one of examples 1-8, wherein detecting the location of the pointer includes: receiving, by the one or more processors, input from a mouse communicatively coupled to the electronic device; and determining the location of the pointer based on the input.

Example 10. An electronic device for rendering system for rendering an item, comprising: a display; a memory storing non-transitory computer-executable instructions; and one or more processors interfacing with the display and the memory, and configured to execute the non-transitory computer-executable instructions to cause the one or more processors to: initiate, on the display, a user interface for displaying a rendering of the item; detect a location of a pointer on the user interface, the pointer controllable by a user of the electronic device; configure a lighting effect simulating a virtual light source by setting a position of the virtual light source to the location of the pointer; generate the rendering of the item by applying the lighting effect to at least a portion of a digital image of the item; and display the rendering in the user interface.

Example 11. The electronic device of example 10, wherein the location of the pointer is a first location, and wherein the one or more processors are configured to execute the non-transitory computer-executable instructions to further cause the one or more processors to: detect a second location of the pointer on the user interface, the second location different from the first location; re-configure the lighting effect by setting the position of the virtual light source to the second location; update the rendering of the item by applying the re-configured lighting effect to the at least a portion of the digital image; and display the updated rendering in the user interface.

Example 12. The electronic device of example 10 or 11, wherein to generate the rendering, the one or more processors are configured to: apply the lighting effect to the at least a portion of the digital image using a scalable vector graphics (SVG) filter.

Example 13. The electronic device of any one of examples 10-12, wherein to generate the rendering, the one or more processors are configured to: apply the lighting effect to the at least a portion of the digital image by: generating a mask representing a circular gradient having a center positioned at the position of the virtual light source; and overlay the mask on the at least a portion of the digital image.

Example 14. The electronic device of any one of examples 10-13, wherein the one or more processors are configured to execute the non-transitory computer-executable instructions to further cause the one or more processors to: receive, via the user interface, an edit to a design element of the item; update the digital image of the item to include the edit to the design element; generate an updated rendering of the item by applying the lighting effect to at least a portion of the updated digital image; and display the updated rendering in the user interface.

Example 15. The electronic device of any one of examples 10-14, wherein to generate the rendering, the one or more processors are configured to: apply the lighting effect to the at least a portion of the digital image based on a simulated finish of a portion of the item corresponding to the at least a portion of the digital image.

Example 16. The electronic device of any one of examples 10-15, wherein to generate the rendering, the one or more processors are configured to: apply the lighting effect to a first portion of the digital image based on a first finish of a first portion of the item corresponding to the first portion of the digital image; and apply the lighting effect to a second portion of the digital image based on a second finish of a second portion of the item corresponding to the second portion of the digital image.

Example 17. The electronic device of any one of examples 10-16, wherein to initiate the user interface, the one or more processors are configured to: initiate the user interface using a web browser application implemented at the electronic device.

Example 18. The electronic device of any one of examples 10-17, wherein to detect the location of the pointer, the one or more processors are configured to: receiving, by the one or more processors, input from a mouse communicatively coupled to the electronic device; and determining the location of the pointer based on the input.

Example 19. A non-transitory computer-readable storage medium having stored thereon a set of instructions, executable by one or more processors, for rendering an item, the set of instructions comprising: instructions for initiating, on a display of an electronic device, a user interface for displaying a rendering of the item; instructions for detecting a location of a pointer on the user interface, the pointer controllable by a user of the electronic device; instructions for configuring a lighting effect simulating a virtual light source by setting a position of the virtual light source to the location of the pointer; instructions for generating the rendering of the item by applying the lighting effect to at least a portion of a digital image of the item; and instructions for displaying the rendering in the user interface.

Example 20. The non-transitory computer-readable storage medium of example 19, wherein the location of the pointer is a first location, and wherein the set of instructions for rendering the item further comprise: instructions for detecting a second location of the pointer on the user interface, the second location different from the first location; instructions for re-configuring the lighting effect by setting the position of the virtual light source to the second location; instructions for updating the rendering of the item by applying the re-configured lighting effect to the at least a portion of the digital image; and instructions for displaying the updated rendering in the user interface.

What is claimed is:

1. A computer-implemented method for rendering an item, the method comprising:
    initiating, by one or more processors, on a display of an electronic device, a user interface for displaying a rendering of the item, wherein the item comprises (i) a first portion having a first texture, and (ii) a second portion having a second texture different than the first texture;
    detecting, by the one or more processors, a location of a pointer on the user interface, the pointer controllable by a user of the electronic device; and
    as the pointer moves to a series of new locations within the user interface:
        configuring, by the one or more processors, a lighting effect simulating a virtual light source by setting a position of the virtual light source to a current new location, of the series of new locations, of the pointer,
        generating, by the one or more processors, the rendering of the item by applying the lighting effect to a digital image of the item according to the position of the virtual light source, including:
            applying the lighting effect to a first portion of the digital image corresponding to the first portion of the item having the first texture to simulate how the first texture would physically appear on the item, and
            applying the lighting effect to a second portion of the digital image corresponding to the second portion of the item having the second texture to simulate how the second texture would physically appear on the item, wherein the lighting effect is applied to the first portion and to the second portion using a single mask image that is dynamically modified or re-generated in real time to reflect movement of the pointer to the current new location of the pointer, and
        displaying, by the one or more processors, the rendering of the item in the user interface.

2. The computer-implemented method of claim 1, wherein generating the rendering includes:
    applying the lighting effect to the digital image using a scalable vector graphics (SVG) filter.

3. The computer-implemented method of claim 1, wherein generating the rendering includes:
    applying the lighting effect to the digital image by:
        generating the single mask image representing a circular gradient having a center positioned at the position of the virtual light source; and
        overlaying the single mask image on the first portion and the second portion of the digital image.

4. The computer-implemented method of claim 1, further comprising:
    receiving, by the one or more processors, via the user interface, an edit to a design element of the item;
    updating, by the one or more processors, the digital image of the item to include the edit to the design element;
    generating, by the one or more processors, an updated rendering of the item by applying the lighting effect to the updated digital image; and
    displaying, by the one or more processors, the updated rendering in the user interface.

5. The computer-implemented method of claim 1, wherein initiating the user interface includes:
    initiating the user interface using a web browser application implemented at the electronic device.

6. The computer-implemented method of claim 1, wherein detecting the location of the pointer includes:
   receiving, by the one or more processors, input from a mouse communicatively coupled to the electronic device; and
   determining the location of the pointer based on the input.

7. An electronic device for rendering system for rendering an item, comprising:
   a display;
   a memory storing non-transitory computer-executable instructions; and
   one or more processors interfacing with the display and the memory, and configured to execute the non-transitory computer-executable instructions to cause the one or more processors to:
      initiate a user interface for displaying a rendering of the item, wherein the item comprises (i) a first portion having a first texture, and (ii) a second portion having a second texture different than the first texture;
      detect a location of a pointer on the user interface, the pointer controllable by a user of the electronic device; and
      as the pointer moves to a series of new locations within the user interface:
         configure a lighting effect simulating a virtual light source by setting a position of the virtual light source to a current new location, of the series of new locations, of the pointer,
         generate the rendering of the item by applying the lighting effect to a digital image of the item according to the position of the virtual light source, including:
            applying the lighting effect to a first portion of the digital image corresponding to the first portion of the item having the first texture to simulate how the first texture would physically appear on the item, and
            applying the lighting effect to a second portion of the digital image corresponding to the second portion of the item having the second texture to simulate how the second texture would physically appear on the item, wherein the lighting effect is applied to the first portion and to the second portion using a single mask image that is dynamically modified or re-generated in real time to reflect movement of the pointer to the current new location of the pointer, and display the rendering of the item in the user interface.

8. The electronic device of claim 7, wherein to generate the rendering, the one or more processors are configured to:
   apply the lighting effect to the digital image using a scalable vector graphics (SVG) filter.

9. The electronic device of claim 7, wherein to generate the rendering, the one or more processors are configured to:
   apply the lighting effect to the digital image by:
      generating the single mask image representing a circular gradient having a center positioned at the position of the virtual light source; and
      overlaying the single mask image on the first portion and the second portion of the digital image.

10. The electronic device of claim 7, wherein the one or more processors are configured to execute the non-transitory computer-executable instructions to further cause the one or more processors to:
    receive, via the user interface, an edit to a design element of the item;
    update the digital image of the item to include the edit to the design element;
    generate an updated rendering of the item by applying the lighting effect to the updated digital image; and
    display the updated rendering in the user interface.

11. The electronic device of claim 7, wherein to initiate the user interface, the one or more processors are configured to:
    initiate the user interface using a web browser application implemented at the electronic device.

12. The electronic device of claim 7, wherein to detect the location of the pointer, the one or more processors are configured to:
    receiving, by the one or more processors, input from a mouse communicatively coupled to the electronic device; and
    determining the location of the pointer based on the input.

13. A non-transitory computer-readable storage medium having stored thereon a set of instructions, executable by one or more processors, for rendering an item, the set of instructions comprising:
    instructions for initiating, on a display of an electronic device, a user interface for displaying a rendering of the item, wherein the item comprises (i) a first portion having a first texture, and (ii) a second portion having a second texture different than the first texture;
    instructions for detecting a location of a pointer on the user interface, the pointer controllable by a user of the electronic device; and
    instructions for, as the pointer moves to a series of new locations within the user interface:
       configuring a lighting effect simulating a virtual light source by setting a position of the virtual light source to a current new location, of the series of new locations, of the pointer,
       generating the rendering of the item by applying the lighting effect to a digital image of the item according to the position of the virtual light source, including:
          instructions for applying the lighting effect to a first portion of the digital image corresponding to the first portion of the item having the first texture to simulate how the first texture would physically appear on the item, and
          instructions for applying the lighting effect to a second portion of the digital image corresponding to the second portion of the item having the second texture to simulate how the second texture would physically appear on the item, wherein the lighting effect is applied to the first portion and to the second portion using a single mask image that is dynamically modified or re-generated in real time to reflect movement of the pointer to the current new location of the pointer, and
          displaying the rendering of the item in the user interface.

* * * * *